UNITED STATES PATENT OFFICE 2,005,069

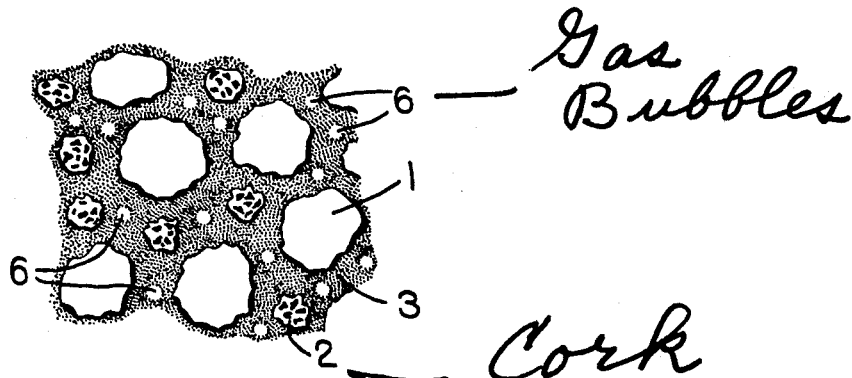
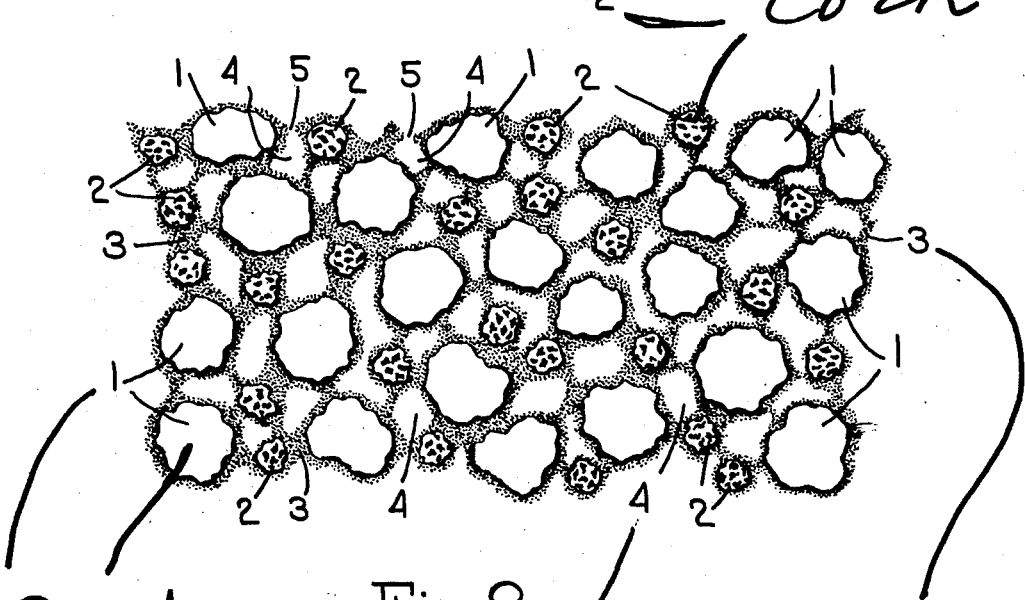

ACOUSTICAL PLASTER OR TILE AND METHOD OF MAKING THE SAME

Napoleon M. Bernier, Cambridge, Mass.

Application April 28, 1932, Serial No. 608,039

4 Claims. (Cl. 106—24)

This invention relates to acoustical plaster or tile and it has for one of its objects to provide a novel acoustical material for use as plaster or for making tile which has an unusually high sound-absorbing capacity and for another object to provide a novel method by which such an acoustical material may be made.

My improved acoustical material is formed from particles or granules of pumice or some similar porous mineral, particles of cork and cementitious ingredient, which when the material is first mixed, substantially fills the interstices between the pumice granules and particles of cork but which when the acoustical material is set only partially fills the space between the granules of pumice and particles of cork, whereby voids exist in the material which are open to the surface. The cork particles, being interposed between the pumice granules, form a non-rigid or cushioned connection between the pumice granules which augments the sound-absorbing quality of the material.

In making the acoustical material I propose to mix the pumice and cork granules with a cementitious substance and the desired voids are produced in the material partly by the use of some ingredient which will generate gas within the material as the mixture is being prepared for use and partly by using an ingredient which will react on the cementitious substance and eat away or destroy a part of it after it begins to set. The generation of the gas forms bubbles throughout the material thereby producing voids and the escape of the gas from the material produces the porous surface which is necessary in an acoustical plaster or tile.

The chemical action on the cementitious substance by which the latter is partially eaten away or destroyed augments the formation of the voids and also reduces the amount of cement remaining in the tile by which the granules are bonded together. The cork granules become distributed between the pumice granules and the reduction of the amount of cement bonding the particles together results in a final material in which the cork granules form a non-rigid or cushioned connection between the pumice granules. The result of this is that the plaster has exceptionally high sound-absorbing qualities.

In order to give an understanding of the invention I have illustrated in the drawing more or less diagrammatically an acoustical material embodying the invention.

Fig. 1 of the drawing shows the acoustical material when it is first mixed with water and applied to the wall, and before it is set;

Fig. 2 illustrates the acoustical material after it has set or become hard and in its final condition.

In the drawing 1 indicates granules of pumice or some similar porous mineral material, 2 indicates particles of cork and 3 indicates a cementitious material which may be in the nature of Portland cement, gypsum or any other suitable material. The pumice granules 1 are preferably considerably larger than the cork particles 2 and the cork particles will be distributed between the pumice particles and all the particles are bonded together by the cementitious substance 3. When the cementitious material is first mixed ready for application to the wall or to be formed into tile, the cementitious substance substantially fills the interstices between the pumice granules 1 and cork particles 2 but after the acoustical material has set and become hard this cementitious substance fills only a part of the space between the pumice granules and cork particles thereby leaving voids indicated at 4 which are open to the surface of the material as indicated at 5 and which aid in giving the material its sound-absorbing qualities.

Cork has a decided resiliency and the distribution of the cork particles 2 between the pumice granules 1 produces a product in which the pumice granules are connected together by a non-rigid or cushioned connection. This non-rigid or cushioned connection between the pumice granules 1, which is the result of the presence of the cork particles 2, serves to augment the sound-absorbing quality of the material so that the degree to which the material absorbs the sound is due partly to the presence of the voids 4 and partly to the cushioned connection between the pumice granules 1 formed by the cork particles 2.

In making this acoustical material I will preferably mix the pumice and cork granules with a suitable binder in dry form such as Portland cement or gypsum and the mixture also has added to it some effervescing ingredient or ingredients in dry form which when water is added will cause a generation of gas, (indicated by the gas bubbles 6 in Fig. 1), and which will also have the effect of eating away or destroying a part of the cementitious material. Such effervescing ingredients may be an acid in dry form, such as an oxalic acid or aluminum sulphate, and any suitable or known material, also in dry form, which reacts with the acid to generate gas. The cementitious material thus includes the Portland cement or gypsum and also these effervescing materials.

These dry ingredients, of course, will remain inert so long as they remain dry but the acoustical plaster or tile can be formed by adding water in proper quantities to this mixture. The water reacts with the cement, gypsum or other cementitious material to form the desired binder and it also causes the acid or sulphate or other effervescing materials to react thereby generating gas which forms voids within the material. This gas escapes to the surface thereby producing the openings 5 at the surface.

The acid or sulphate not only functions to generate the gas which is a factor in producing the desired voids in the materials but the chemical reaction results in eating away or destroying a portion of said mixture thereby increasing the voids. The voids 4 which finally exist in the product are partly formed by the generation of the gas and are partly formed by the eating away or destruction of part of the cementitious substance. These voids are of generous size which is an advantage in the production of sound-absorbing material. I will preferably use about 3 parts by volume of granulated pumice to 1 part by volume of granulated cork.

The cork granules 2 are preferably smaller than the pumice granules 1. I have found good results to follow from using pumice granules which would pass through about a 6-mesh screen and cork granules which would pass through about an 18-mesh screen. These smaller cork granules become distributed between the larger pumice granules and by the reduction of the amount of cement as above described a product will result in which the cork granules situated between the pumice granules form a non-rigid or cushioned connection between said pumice granules. This non-rigid bonding of the pumice granules together is helped by the fact that the amount of cement remaining in the final product is reduced considerably by the chemical action which eats away or destroys the cement.

The final structure is thus one which has relatively large voids and in which the pumice granules are connected to a considerable degree by a cushioned or non-rigid connection.

The extent of the voids 4 depends somewhat upon the amount of acid or sulphate which is used. By increasing the amount of acid or sulphate the size of the voids 4 will be increased and by decreasing the amount of sulphate voids of lesser size will be produced. Moreover, the amount of acid or sulphate which it is desired to use will vary somewhat with the character of the cementitious substance used. Generally speaking, I find that about from 2% to 10% of aluminum sulphate, depending upon the character of the cementitious substance used, give satisfactory results.

The acoustical material made in accordance with this invention has unusually high sound-absorbing qualities. In fact, tests which have been made indicate that a plaster or tile made in accordance with this invention has a capacity of absorbing as much as 50% of the sound at 512 D. V.

I claim:

1. The method of making a sound-absorbing material for walls which consists in forming a cementitious mixture in which is incorporated granules of pumice and cork in proportions of approximately three to one, causing the generation of gas within the mixture thereby to produce voids and producing a chemical reaction on the cementitious substance which destroys a portion thereof and thereby produces additional voids.

2. A sound-absorbing material for walls comprising granules of pumice and cork in proportions of approximately three to one, bonded together by a cementitious substance which only partially fills the spaces between said particles, the cork particles being considerably smaller than the pumice particles and being interposed between the pumice particles, thereby forming a non-rigid or cushion connection between said pumice particles.

3. The method of making a sound-absorbing material for walls which consists in mixing together granules of both pumice and cork, a cement in dry form and effervescing materials in dry form, adding water to the dry mixture to form a plastic mass in which the effervescing ingredients when acted on by the water react with to form gas bubbles within the mass, thereby producing voids and also react with the cementitious substance to destroy a portion thereof thereby producing additional voids.

4. The method of making a sound-absorbing material for walls which consists in mixing together pumice granules, cork granules, a cementitious material in dry form containing effervescing ingredients in dry form, adding water to the dry mixture to form a plastic mass in which the effervescing ingredients, when acted on by the water, react to form gas bubbles within the mass, thereby producing voids, and also to destroy a portion of the cementitious material thereby producing additional voids.

NAPOLEON M. BERNIER.